May 12, 1936. T. W. HALLERBERG 2,040,376
APPARATUS FOR CLEANING AIR
Filed June 21, 1935 4 Sheets-Sheet 4

Inventor
Theodore W. Hallerberg.
by Charles O'Neill
Atty.

Patented May 12, 1936

2,040,376

UNITED STATES PATENT OFFICE 2,040,376

APPARATUS FOR CLEANING AIR

Theodore W. Hallerberg, Chicago, Ill., assignor to United Air Cleaner Co., Chicago, Ill., a corporation of Illinois Application June 21, 1935, Serial No. 27,676

30 Claims. (Cl. 183—15)

REISSUED
NOV 21 1939

This invention relates to improvements in apparatus for cleaning air and other gases, and more particularly to air cleaners of the liquid bath type wherein the air or gas to be cleansed is washed in a liquid.

The present invention is highly desirable for use in connection with the air intake of internal combustion engines, air compressors, or other mechanisms wherein a supply of clean air is desirable, although the invention will have other uses and purposes as will be apparent to one skilled in the art.

An object of this invention is to provide an air cleaner of compact construction, capable of occupying a relatively small space and also capable of cleansing air with an extremely high degree of efficiency and substantially freeing the air of all cleansing liquid prior to the exit of the air from the cleaner.

Also an object of this invention is the provision of an air cleaner of the liquid bath type in which a goodly portion of cleansing liquid is centrifuged from the air after a satisfactory comminglement of air and liquid.

Another object of the invention is the provision of a liquid bath air cleaner including filter means and centrifuging means intimately associated with the filter means in such a manner as to separate entrained liquid from outgoing air and urge the separated liquid away from the outlet of the cleaner.

Another feature of this invention is the provision of a liquid bath air cleaner incorporating a combination centrifuging and baffle element capable of removing entrained cleansing liquid from air by centrifugal action.

A further feature of the invention is the provision of a liquid bath air cleaner embodying filter means in advance of the outlet and centrifuging means so disposed as to distribute outgoing air substantially uniformly over the filter means.

Still another object of this invention is the provision of a liquid bath air cleaner including spaced filter elements with a gap therebetween through which air must travel in passing through the cleaner.

It is also an aim of this invention to provide a liquid bath air cleaner having spaced filter elements therein positioned so that air must travel first through one and then the other, with centrifuging means located between the filter elements, the arrangement being such that entrained moisture separated from traveling air by the second filter element and by the centrifuging means returns to such a position that incoming air picks up the separated cleansing liquid and washes it over the first filter means.

Also an object of the invention is the provision of a liquid bath air cleaner wherein a continuous and rapid circulation cycle of cleansing liquid is maintained during operation.

It is also a feature of this invention to provide a liquid bath air cleaner including filter means and having an arrangement of parts such that the filter means is continuously washed of dirt and débris taken from incoming air during the cleansing action.

A further object of the invention is the provision of an air cleaner of the character specified herein which is extremely simple and economical in construction and can readily be taken apart for cleansing or replacement of parts.

The invention also incorporates the cleansing of air or other gases by a new and novel method.

The method involved in this invention also includes the steps of commingling incoming air with a cleansing liquid, filtering the air, and centrifuging entrained liquid from the air.

While some of the more salient features, characteristics and advantages of this invention have been above pointed out, others will become apparent from the following disclosures.

As an illustrated embodiment of the present invention there is shown an air cleaner of the hat or bonnet type, which is circular in shape and which has a central outlet opening through which the air passes downwardly into the carbureter intake conduit. The intake opening to the cleaner is shown as annular, and the air first descends into the annular inlet passage, passes upwardly through the cleaner, and then descends into the carbureter intake conduit.

It will, of course, be appreciated that while this is a highly desirable type of construction and shape for an air cleaner embodying this invention, various shapes of cleaners and arrangements in locations of inlet and outlet openings may be provided without departing from the spirit of the invention.

Figures 2, 5, 6, 7, 8:
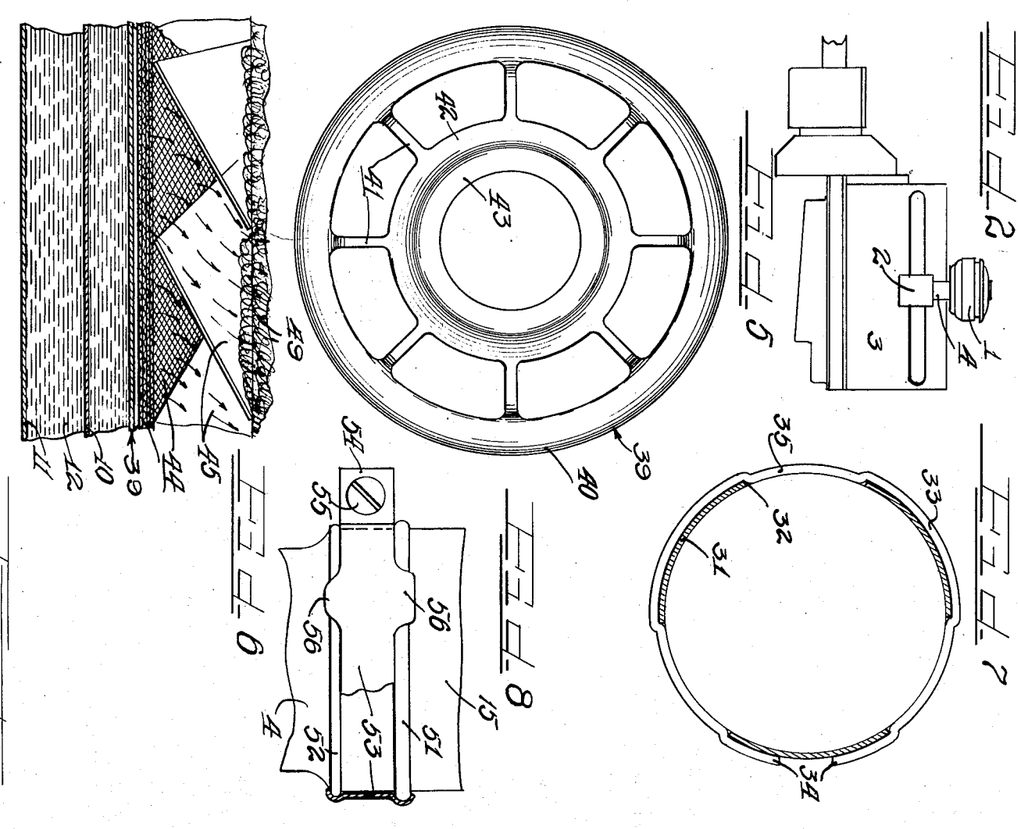
Figure 2 is a fragmentary diagrammatic view illustrating the structure of Figure 1 mounted upon an internal combustion engine.
Figure 5 is a plan view of the supporting spider removed from the air cleaner.
Figure 6 is an enlarged fragmentary vertical sectional view taken substantially as indicated by the staggered section line VI—VI of Figure 1.
Figure 7 is a plan sectional view illustrating the baffle holding means with the other parts removed.
Figure 8 is a fragmentary part sectional, part elevational view illustrating the attaching means for securing the air cleaner to the intake conduit of a carburetor.

With reference to Figure 2, the illustrated embodiment of the air cleaner which is generally indicated by reference numeral 1, is shown as mounted on a carbureter 2, diagrammatically illustrated, in turn associated with an internal combustion engine 3 of the automotive type. The cleaner 1 is mounted upon the top of the carbureter intake conduit 4, and is of such a size as to fit nicely within the space between this conduit and the hood of the engine which is not shown in the drawings.

Figure 1:
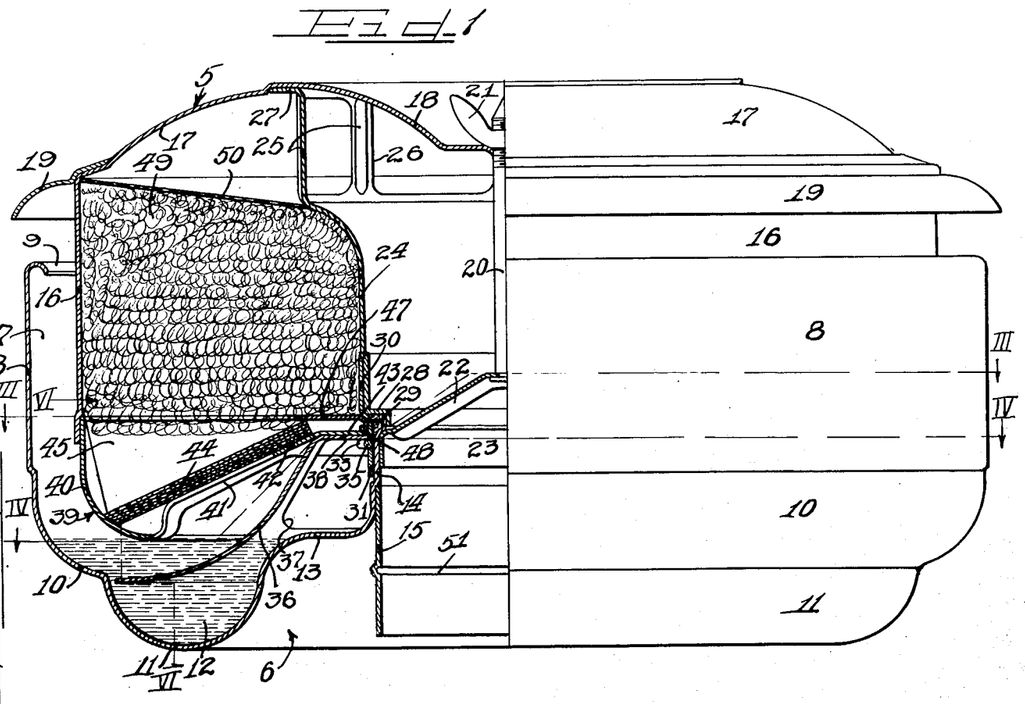
Figure 1 is a part elevational, part vertical sectional view of an air cleaner embodying principles of the present invention.

With reference now to Figure 1, it will be seen that the cleaner itself comprises a casing made up of two separable parts, an upper part generally indicated by reference numeral 5 and a lower part generally indicated by numeral 6. The upper casing section is of less diameter than the lower casing section, so that when arranged in substantially telescopic order, an annular passage 7 is left between the casing sections to function as an air inlet. Each of the casing sections 5 and 6 carries a plurality of parts affixed thereto, and subsequently herein these parts will be described as welded to the portions of the casing, since spot welding is a very feasible and advantageous manner for permanently connecting said parts. However, it will be understood that, if so desired, such relative parts may be secured together by brazing, riveting or in any other suitable manner.

The lower casing section 6 is preferably pressed or die-formed from a single sheet of stock, and includes a substantially vertical side wall 8 having an inwardly turned upper margin 9 to prevent liquid from splashing out of the inlet passage 7 between the casing sections. The wall 8 is arcuately stepped in as at 10, and then again arcuately stepped in to form a liquid sump 11 for any suitable cleansing liquid 12. In the liquid sump 11 the wall is curved into a substantially horizontally extending portion 13 which in turn curves into a central vertical portion 14 defining a part of the outlet passage from the cleaner. The wall portion 14 is shouldered sufficiently to accommodate an outlet conduit 15 in such a manner that the inside face of the wall portion 14 above the conduit 15 is flush with the inside face of the conduit, as clearly seen in Figure 1.

The conduit 15 is preferably spot welded to the wall portion 14.

The upper casing section 5 includes a substantially vertical outer wall 16 which merges at its upper end into a dome-like top 17 centrally dished as at 18. The entire portion of this section 5 is closed to outside air. Spot welded to the top section 5 adjacent the upper portion of the vertical wall 16 is an annular hood or visor 19 which extends outwardly sufficiently far to overlie the air inlet 7 between the two casing sections.

The casing sections are removably held together by means of a bolt 20 extending through the portion 18 of the upper section and engaged by a wing nut 21. The lower end of the bolt is anchored in a yoke bracket 22 preferably formed integral with a ring base 23 spot welded to the vertical wall 14 of the lower section. It is therefore apparent that when the wing nut 21 is removed, the casing sections may be separated merely by pulling them apart, and the removal of the lower section 6 results also in the removal of the conduit 15, the ring 23 and its bracket 22, and the bolt 20. All of the other parts of the cleaner previously described and to be later described herein remain attached to the upper casing section 5. Thus, with the removal of the lower section 6, the liquid sump 11 is readily accessible for removal of dirt and replenishing with cleansing liquid.

The central outlet passage for cleaned air is of such size that the bracket 22 and bolt 20 afford negligible restriction to the flow of air. This outlet passage is defined in its upper part by a tubular member 24 which arcuately merges into a larger upper wall portion 25 provided with suitable relatively large apertures 26 through which cleaned air may leave the cleaner and pass through the outlet passages of the carbureter. Near its top, the wall 25 is flanged outwardly as at 27, which flange is spot welded to the upper casing section 5. At the lower end thereof, the tubular outlet member 24 is stepped inwardly and downwardly as at 28 to provide on the under side thereof a socket for an annular packing gland 29. The packing gland 29 is held in position by means of a relatively short cylindrical member 30 spot welded to the outer face of the tubular member 24 and arced inwardly adjacent the packing 29 to a cylindrical portion 31 of less diameter which telescopically receives the vertical wall portion 14 of the lower casing section 6. The packing gland 29 is abutted by the inwardly rolled upper edge of the wall portion 14.

All of the interior structural parts of the air cleaner are carried by the upper casing section 5, and mainly by the cylindrical member 30 attached to the outer face of the tubular outlet member 24. With reference to Figure 7, it will be seen that the portion 31 of this member 30 is provided with elongated apertures 32 at spaced intervals therearound. A spring ring 33 having open ends 34 and provided with inwardly offset portions 35 is positioned around the cylindrical member 31 so that the offset portions 35 are each engaged in one of the apertures 32. This spring ring, obviously, normally tends to contract, and by separating the open ends 34 against the action of the ring, it may be snapped around or removed from the cylindrical member 31. When in position, with the portions 35 of the ring engaged in the apertures 32, the projecting parts of the ring between the offset portions 35 effectively hold all of the structural interior parts of the cleaner in position.

Any suitable cleasing liquid may be used in the sump 11, used crank case oil, if relatively thin, being quite suitable for this purpose. The liquid sump is preferably filled to a level extending approximately half way up the arcuate portion 10 of the lower casing structure, as clearly seen in Figure 1. Of course, this is a desirable level, but not an essential one, variations in the depth of the cleansing liquid through a reasonable range not affecting materially the operation of the cleaner.

Figure 4:
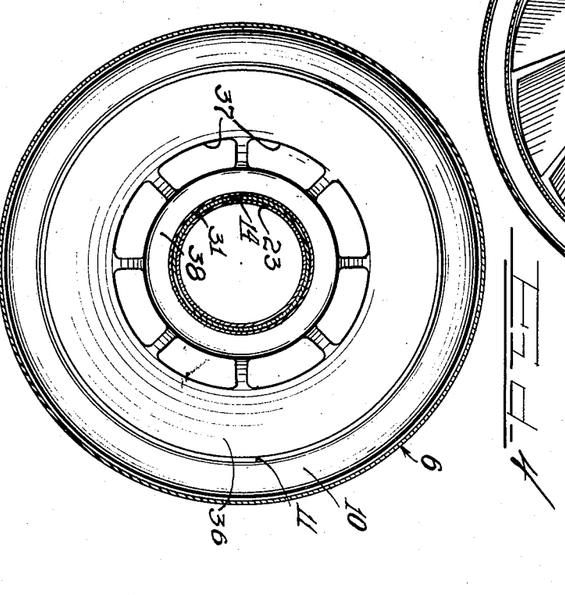
Figure 4 is a plan sectional view, taken substantially as indicated by the staggered line IV—IV of Figure 1, the section being taken so that the entire upper surface of the baffle member is visible in plan.

An annular baffle 36, which is shaped arcuately substantially in accordance with the direction of travel of air passing through the cleaner, extends into the sump 11 below the normal liquid level. As seen in Figures 1 and 4, it terminates short of the wall portion 10 of the lower casing section, leaving a relatively narrow annular opening between the baffle and the casing sections. That portion of the baffle which is submerged when the cleaner is not in use is preferably imperforate, while the portion of the baffle extending out of the liquid sump is provided with relatively large openings 37. Above the openings 37 the baffle is flanged radially inwardly to form an imperforate portion 38 which fits intimately around the cylindrical member 31 and rests upon the spring ring 33.

Disposed immediately above the baffle 36 is a supporting spider generally indicated by numeral 39. As seen clearly in Figures 1 and 5, this spider has an outer substantially vertical wall 40 telescopically fitting within the lower margin of the wall 16 of the upper casing section 5. The wall 40 proceeds substantially vertically for a short distance and curves inwardly in general with the curvature of the wall portion 10 of the lower casing section to a point adjacent the normal or preferable liquid level. The spider 39 is imperforate to approximately the liquid level, but the inner portion of the spider extends above the liquid level in a plurality of relatively narrow and widely spaced legs 41 which terminate in a sloping imperforate portion 42 merging into a central radial flange 43 resting upon the radial flange 38 of the baffle.

The outwardly and downwardly sloping legs 41 of the spider 39 together with the imperforate portion 42 support an annular filtering element 44 similarly inclined away from the outlet of the cleaner. This filter element is preferably made up of a plurality of layers of screens, ordinary window screen being satisfactory, with the strands of each layer preferably disposed slightly at an angle to the corresponding strands of an adjacent layer. Heavier dirt particles carried by incoming air will be removed by this filter element 44. Due to the sloping position of this element, it is constantly washed by sump liquid thrown thereagainst by incoming air.

Figure 3:
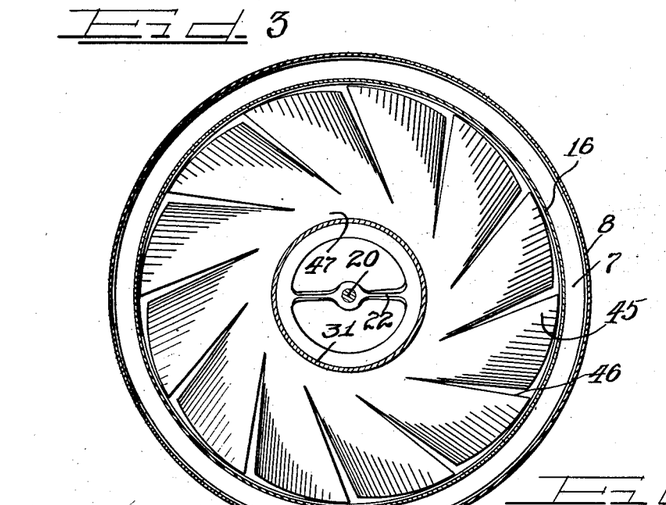
Figure 3 is a reduced plan sectional view taken substantially as indicated by the staggered sectional line III—III of Figure 1, this sectional line traveling over the entire upper surface of the stationary fan and over the upper surface of the center yoke, with the annular packing removed.

Incoming air will obviously be commingled with sump liquid and a considerable portion of the dirt carried by the air will be removed therefrom by this liquid. It is, of course, necessary to remove substantially all of the liquid from the air prior to the exit of the air from the casing so that there will be no carry-over of sump liquid into the carburetor of the engine. Heretofore, it has been customary to rely upon a relatively large mass of filtering media for removing entrained liquid from outgoing air. Where the size of the cleaner is substantially immaterial and a relatively great amount of filter media can be used, entrained moisture can so be removed from the air to a satisfactory extent. However, the present invention is designed to function efficiently and still occupy a relatively small space. Accordingly, other means to aid in separating cleansing liquid from the air are highly advantageous if not necessary, and to this end I have provided centrifuging means in the form of a stationary fan 45 slotted as at 46 in Figure 3 to provide a plurality of blades each of which is bent so that one edge thereof extends downwardly and rests upon the filter screen 44 to hold this screen in position upon the legs 41 of the spider 39. From approximately the inner end of the filter screen 44, the stationary fan 45 is even and imperforate, as at 47, the inner margin of this imperforate portion being turned downwardly as at 48 to rest upon the radial flange 43 of the spider 39. It is apparent that air passing through the stationary fan 45 will be given a whirling action, and sump liquid traveling with the air will be separated from the air by centrifugal force. The fan is so arranged as to direct both the air and the liquid traveling therewith towards the outer wall 16 of the upper casing section so that a straight path from the sump to the openings 26 in the tubular outlet member 24 cannot be followed by the air. It is also to be noted that the fan 45 is of such relatively large surface area that a goodly portion of sump liquid will be removed from the air merely by contact with the fan. Another goodly amount of sump liquid, especially the heavier dirt-laden particles thereof, will be centrifuged from the air by the fan.

Some sump liquid, such as a light substantially atomized portion thereof, may still be left in the air after passing through the fan 45. To insure the removal of this portion of the cleansing liquid, the space above the fan between the outer casing wall 16 and the tubular outlet member 24 is filled with a filter medium 49, curled cattle tail hair being highly desirable for this purpose. This filter medium is maintained in position at the bottom of the fan 45, and at the top by means of an annular screen 50, which is preferably of relatively fine mesh so as to function as a flame arrester.

Suitable means for attaching the air cleaner to the intake conduit 4 of the carburetor are best seen in Figure 8. The outlet conduit 15 disposed in the recessed bottom of the cleaner is provided with outwardly projecting means, such as the annular bead 51. The carbureter intake conduit 4 is likewise provided with similar means 52. These beads are disposed a suitable distance away from the ends of the respective conduits, and the intake conduit 4 telescopically fits within the outlet conduit 15 a distance permitted by the bead 52. A split ring clamping member 53 of a size to intimately embrace the conduit 15 between the beads 51 and 52 is so positioned. This clamping member is provided with laterally extending ends 54 held together by suitable bolt and nut means generally indicated at 55. At spaced points therearound, the clamping ring 53 is provided at opposite sides thereof with outwardly projecting bead-like portions 56 shaped to intimately fit over the beads 51 and 52. If so desired, these portions 56 may be resilient in character so that they might be snapped over the respective beads 51 and 52, and then a firm uniting of the outlet conduit 15 with the intake conduit 4 may be established by further tightening of the clamping ring therearound.

In operation, the present invention is extremely simple and effective. Assuming that the internal combustion engine 3 is started, the suction produced by this engine will draw air through the air cleaner into the intake conduit 4 to the carbureter. As the air enters the cleaner, it will pass downwardly through the intake passage 7 and sweep up the cleansing liquid above the baffle 36, carrying this cleansing liquid upwardly against the undersurface of the screen filter 44. During this movement, there will be a thorough comminglement of air and cleansing liquid. Heavier dirt particles will be removed from the air by the screens 44. Upon passing through the screen, the air and cleansing liquid traveling therewith will both be centrifuged by the stationary fan 45, and both the air and liquid will be directed towards the outer casing wall 16. It will be noted that the central imperforate portion of the baffle, spider and centrifuging means insure an initial contact of the air substantially centrally of the centrifuging means and upon the filter medium 49 thereabove.

By contact with the stationary fan 45 and the centrifuging action imparted thereby, heavier particles of traveling liquid will be removed from the air, and due to the centrifuging action and the sloping fan blades, this liquid will descend along the outer portion of the cleaner and fall through the spider between the outer portions of the legs 41 thereof into the path of incoming air. This separated liquid will be met by incoming air and the lighter and relatively clean portion thereof will be picked up by incoming air and washed over the sloping surface of the screen 44. The heavier dirt-laden particles of the oil will fall upon the baffle 36 and will be urged upwardly along this baffle by incoming air until these heavier dirt-laden globules fall through the openings 37 into the bottom of the sump 11. The disposition of the baffle provides a zone of comparative quietude in the sump beneath the baffle so that the dirt may accumulate in this zone. As the dirt accumulates, the liquid level rises and more liquid will be educed through the opening between the outer edge of the baffle and the casing wall by incoming air or will pass therethrough due to the rise in the liquid level to be picked up by incoming air and circulated as above described. The dirt in the quiet zone defined by the baffle may be easily removed upon separation of the casing sections of the cleaner as above described. This dirt accumulated in this quiet zone will not be again passed through the cleaner during the operation of the cleaner, but will remain in the quiet zone until removed. Any relatively light or substantially atomized liquid remaining in the air after passing through the centrifuging means will be removed from the air by the filter medium 49 so that the air may descend through the outlet passage into the carbureter in a clean and dry state.

It is apparent from the foregoing that the cleaner has an interior structural arrangement defining a complete circulation cycle for the cleansing liquid. This circulation cycle is comparatively rapid in action so that the air is effectively washed by cleansing liquid and the screen 44 is maintained in a clean state by the washing action of incoming air and liquid.

Of course, the lower portion of the filter medium 49 will gradually become saturated to such an extent that all particles or globules will drip downwardly upon the screen 44, and these globules passing through the screen in a reverse direction also aid in the cleansing of the screen.

From the foregoing description, certain features of the structure are apparent. One of these features is the fact that there is a space between the filter element 44 and the filter element 49 through which the air must travel in a substantially vertical direction. This space alone aids in removing entrained moisture from the air due to the heavier character of the cleansing liquid. Air, in passing through the cleaner might urge cleansing liquid along a structural surface, but air will not carry liquid to such an extent over an open space. It will also be noted that the centrifuging means force the air currents substantially uniformly over the central and outer portions of the filter medium 49, thus avoiding a full saturation of the inner portion of the filter medium and avoiding leaving the outer portion comparatively dry.

Figure 9:
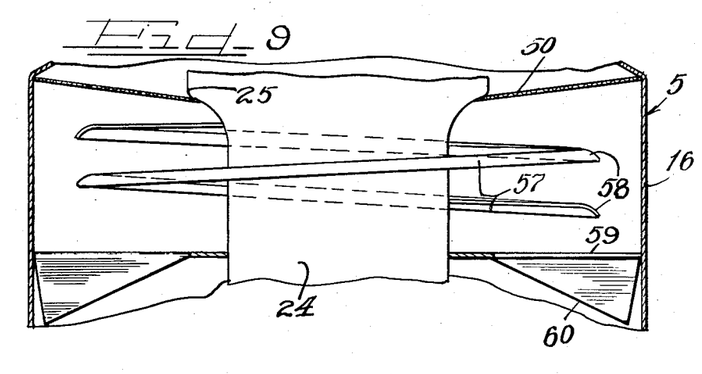
Figure 9 is a fragmentary vertical sectional view through the upper portion of an air cleaner, with the filter element removed, showing a modified structure.

In Figure 9, I have shown a modified form of centrifuging means. In this figure, the casing structure is substantially the same as that previously described, including the outlet member 24 and the casing wall 16, with the upper screen 50 therebetween. For the purpose of clarity, the filter element 49 has been removed from the showing in Figure 9. In this instance, the centrifuging means or element is shown as being in the form of a vane member 57 spiraled around the outlet member 24 in intimate edge contact therewith and extending a suitable distance towards the casing wall 16. The outer edge of the vane, of course, does not reach to the casing wall, leaving sufficient room therebetween for the passing of an adequate amount of air. The outer margin of the vane 57 is rolled downwardly as indicated at 58 to further aid in preventing cleansing liquid from passing around the edge of the vane towards the outlet passage of the cleaner. The centrifuging device 57 may be disposed at any desirable or suitable location along the outlet member 24, either below the filter medium 49, or the filter medium 49 may be interposed between the spirals of the vane 57.

With the use of a spiraled vane 57, it is not essential that the stationary fan 45 previously described herein also be employed. However, with the structure illustrated in Figures 1 to 8, inclusive, it is desirable to utilize some element to hold the screen filter 44 down upon the spider 39 in sloping position. To this end, an annular member 59 having straight downwardly depending blades 60 with relatively large apertures therebetween may be substituted for the stationary fan 45, this element being sufficient to hold the screen 44 in position and yet not interfere with the passage of an adequate amount of air.

Of course, if so desired, both the stationary fan 45 and the spiraled vane 57 may be utilized in the same cleaner.

The operation of the structure shown in Figure 9 is substantially the same as that previously described herein.

Figure 10:
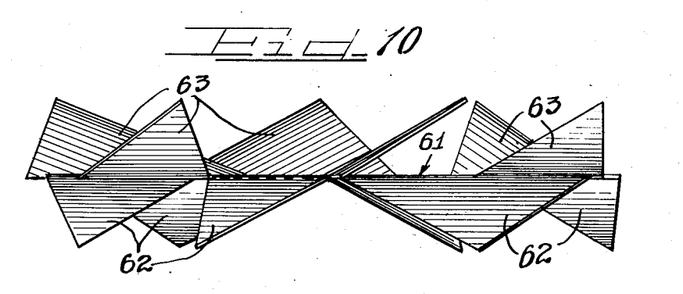
Figure 10 is a side elevational view of a different form of stationary fan structure.

In Figure 10, I have shown a modified form of stationary fan of the character of the aforesaid fan 45. In this instance a fan 61 is employed having a downwardly extending blade 62 and an upwardly extending blade 63. With the use of the fan 61, the downwardly extending blade 62 will hold the filter screen 44 in position and the upwardly extending blade 63 will project into intimate association with the filter medium 49. Of course, both the blade 62 and the blade 63 of this stationary fan are so arranged as to impart a whirling or centrifuging action to the air and cleansing liquid contacting the fan.

It will, therefore, be apparent that insofar as the stationary fan is concerned, the blades thereof may be projecting downwardly, upwardly, or both, as may be deemed most feasible.

The novel method of cleaning air embodied in this invention is believed to be apparent from the foregoing description of the operation of the device. It suffices to say at this point that the method includes the steps of commingling air to be cleaned with a cleansing liquid and centrifuging the cleansing liquid from the air after this comminglement. More specifically, the method may be said to include the steps of commingling air with cleansing liquid, filtering the air, centrifuging the air and cleansing liquid to separate cleansing liquid from the air, and then again filtering the air to remove minute or atomized globules of cleansing liquid from outgoing air.

It will be obvious that the present invention may be used in the cleaning of gases other than air, and it is so intended. Therefore, where the term "air" is used herein and in the appended claims, the same may be construed as including air and other gaseous fluids capable of being handled in similar manner.

From the foregoing, it is apparent that I have provided not only a novel method of cleaning air, but also an apparatus for cleaning air which is constructed in an economical and durable manner and which is arranged to occupy an extremely small space and yet perform its function with a very high degree of efficiency. It is also apparent that the structure illustrated and described herein may be readily taken apart for the removal of the accumulated dirt and refilling of cleansing liquid. Also, all the structural parts of the cleaner, with the exception of the casing walls, are readily removable for repair or replacement.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In an air cleaner, a casing having spaced inlet and outlet openings and arranged to contain a cleansing liquid for comminglement with incoming air, separate filter elements disposed in said casing so as to leave an air gap therebetween, and centrifuging means disposed in said air gap.

2. In an air cleaner, a casing having spaced inlet and outlet openings and arranged to contain a cleansing liquid for comminglement with incoming air, separate filter elements disposed in said casing so as to leave an air gap therebetween, and centrifuging means disposed in said air gap, said centrifuging means being positioned to maintain said air gap by keeping said filter elements separated.

3. In an air cleaner, a casing having spaced inlet and outlet openings and arranged to hold a cleansing fluid for comminglement with incoming air, filter means in said casing in advance of the outlet opening, and centrifuging means between said filter means and the outlet opening arranged to alter the natural bearing of the traveling air, the parts being so arranged that cleansing liquid centrifuged from outgoing air returns to the path of incoming air to be forcibly carried over and wash said filter means.

4. In an air cleaner, a casing having spaced inlet and outlet openings and arranged to contain a cleansing liquid for comminglement with incoming air, and spaced filter elements in said casing arranged one in advance of the other and in a manner that cleansing liquid filtered from outgoing air by the second filter element returns in an opposite direction through the first filter element and cleanses the latter, one of said filter elements sloping away from said outlet opening.

5. In an air cleaner, a casing having spaced inlet and outlet openings and arranged to contain a cleansing liquid for comminglement with incoming air, spaced filter elements in said casing arranged one in advance of the other so that air passing from the inlet to the outlet opening must pass successively through the filter elements after comminglement with cleansing liquid, and centrifuging means between said filter elements to separate cleansing fluid from passing air and direct the fluid away from the outlet opening.

6. In an air cleaner, a casing having spaced inlet and outlet openings and arranged to contain a cleansing liquid for comminglement with incoming air, filter means in said casing in advance of said outlet and sloping away from said outlet, and centrifuging means for separating cleansing liquid from outgoing air disposed between said filter means and the outlet opening and arranged to direct separated liquid towards the portion of said filter means farthest from the outlet opening.

7. In an air cleaner, a casing having spaced inlet and outlet openings and arranged to contain a cleansing liquid for comminglement with incoming air, spaced filter elements in said casing disposed so that air must pass through one and then through the other, the first of said filter elements sloping away from the outlet opening, and centrifuging means disposed between said filter elements for separating cleansing fluid from outgoing air, said centrifuging means being graduated in size in accordance with the slope of said first filter element.

8. In an air cleaner, a casing having spaced inlet and outlet openings, said casing having a liquid sump positioned sufficiently close to the path of air traveling from the inlet to the outlet to insure a comminglement of air and sump liquid, filter means disposed across the air path, and centrifuging means across the air path arranged to direct liquid and air away from a direct path to said outlet opening, the parts being arranged in such a manner that sump liquid centrifuged from air will return in the path of incoming air to be commingled therewith, washed over said filter means and again centrifuged to establish a complete circulation cycle for sump liquid.

9. In an air cleaner, a casing having spaced inlet and outlet openings, said casing having a liquid sump positioned adjacent the path of incoming air, baffle means arranged to establish a quiet zone in said sump for the accumulation of dirt removed from air, filter means across the air path, and centrifuging means associated with said filter means for removing entrained sump liquid from passing air.

10. In an air cleaner, a casing having spaced inlet and outlet openings, said casing having a liquid sump therein adjacent the path of incoming air, baffle means having an imperforate portion extending into said sump to define a zone of comparative quietude and an open part thereabove through which dirt may fall into said zone, filter means in advance of said outlet, and means associated with said filter means to direct air and entrained sump liquid away from a direct path to said outlet.

11. An air cleaner having spaced inlet and outlet openings and a liquid sump adjacent the path of incoming air, means arranged to remove entrained sump liquid from outgoing air, and a baffle member curved in accordance with the passage of air through the cleaner and having an imperforate part extending into said sump to define a zone of comparative quietude and an open part thereabove through which dirt may enter said zone.

12. In an air cleaner, a casing comprising separable portions and having spaced inlet and outlet openings, said casing having a liquid sump adjacent the path of incoming air, filter means in said casing across the air path, a spider holding said filter means in position, and centrifuging means between said filter means and said outlet.

13. In an air cleaner, a casing having spaced inlet and outlet openings and a liquid sump adjacent the path of incoming air, and centrifuging means in advance of said outlet, said centrifuging means being in the form of a spiral baffle in the path of air traveling towards said outlet.

14. In an air cleaner, a casing having spaced inlet and outlet openings and a liquid sump adjacent the path of incoming air, and centrifuging means in advance of said outlet, said centrifuging means being in the form of a spiral baffle in the path of air traveling towards said outlet with the outer peripheral margins arced away from the outlet.

15. In an air cleaner, a casing having spaced inlet and outlet openings, means in said casing for cleaning air, a conduit leading from said outlet opening and having bead-like means projecting outwardly therefrom, and a clamp element having an inset central portion and an outer portion shaped to fit over said bead-like means.

16. In combination, an air conduit having bead-like means projecting outwardly therefrom, an air cleaner, an outlet conduit leading from said cleaner and also having bead-like means projecting therefrom and shaped for telescopic association with said air conduit, and a clamp member comprising a central portion and resilient portions extending in opposite directions therefrom shaped for engagement over said bead-like means to hold said air conduit and said outlet conduit joined.

17. In an air cleaner for disposition on top of a downdraft air intake, a casing comprising separable sections for telescopic association in spaced relationship to provide therebetween an air inlet passage, an outlet conduit for cleaned air extending through the lower casing section, said lower section having a liquid sump therein around said outlet conduit, filter means in said casing above said sump and in advance of said outlet in the path of air traveling through the cleaner, and a baffle disposed around said outlet conduit in said casing extending into said sump and arranged to provide an opening through which sump liquid may be educed by traveling air and also arranged to provide a passage adjacent said outlet conduit through which dirt removed from the air may pass into said sump.

18. In an air cleaner, a casing having inlet and outlet openings, said casing also having a sump for cleansing liquid adjacent the path of incoming air, and a baffle extending into said sump and arranged to provide an opening through which sump liquid may be educed by air traveling over the baffle, said baffle also being arranged to provide a dirt passage adjacent that portion of the baffle farthest from the inlet which passage leads into said sump.

19. In an air cleaner, a casing having an inlet opening, outlet conduit means extending into said casing, said casing having a liquid sump therein adjacent said conduit means, and baffle means associated with said liquid sump over which incoming air must travel, said baffle means being arranged to provide a passage between itself and said conduit means through which dirt may enter said sump.

20. In an air cleaner, a casing having an annular inlet passage, centrally disposed outlet conduit means extending into said casing, said casing having a liquid sump therein around said conduit means, and an annular baffle associated with said sump and disposed around said conduit means in such a manner as to leave a passage between the body of the baffle and the conduit means through which dirt may enter said sump.

21. In an air cleaner, a casing having a substantially annular inlet leading downwardly, outlet conduit means extending into said casing through the bottom thereof, said casing having a liquid sump around said conduit means, and baffle means around said conduit means in the path of incoming air, said baffle means having a part thereof submerged in the initial liquid level and a part extending without the initial liquid level in spaced relationship to said conduit means to provide an opening through which dirt may descend into said sump.

22. In an air cleaner, a casing having a substantially annular inlet leading downwardly, outlet conduit means extending into said casing through the bottom thereof, said casing having a liquid sump around said conduit means, and baffle means around said conduit means in the path of incoming air, said baffle means having a part thereof submerged in the initial liquid level and a part extending without the initial liquid level in spaced relationship to said conduit means to provide an opening through which dirt may descend into said sump, and said baffle means being arranged to provide an opening through which sump liquid may be educed by incoming air.

23. In an air cleaner, a casing having an inlet and an outlet, said casing having a liquid sump therein adjacent the path of incoming air, a baffle of a sufficient size to substantially separate said sump from the upper region of the casing but arranged to provide an opening through which sump liquid may be educed by incoming air, said baffle having a central opening through which dirt may enter said sump, and guiding means associated with said baffle to direct traveling air towards the outer wall of said casing.

24. In an air cleaner, a casing having an inlet and an outlet, said casing having a liquid sump therein adjacent the path of incoming air, a baffle associated with said sump and positioned so that incoming air must wash sump liquid over the baffle, and centrifuging means disposed between said baffle and said outlet.

25. In an air cleaner, a casing including a pair of separable sections for telescopic association in spaced relationship to define therebetween an inlet passage, outlet conduit means centrally disposed in each of said casing sections also for telescopic association to form an outlet conduit for the cleaner, and an inwardly extending packing element carrier on the larger of said conduit means against which the end of the smaller of said means abuts when the casing sections are joined.

26. In an air cleaner, a casing including a pair of separable sections spaced to define an inlet passage therebetween, an outlet conduit section in each of said casing sections, said conduit sections being arranged for telescopic association to form an outlet passage for the cleaner, one of said conduit sections carrying a bracket therein, and securing means extending from said bracket through the other conduit section and through the wall of the opposite casing section to hold said casing sections together.

27. In an air cleaner, a casing including separable sections, outlet conduit means in each of said sections for telescopic association to provide an outlet conduit for the cleaner, one of said casing sections having a liquid sump therein adjacent said outlet conduit, and a baffle associated with said sump and positioned in the path of incoming air, said baffle being arranged to provide an opening between itself and said outlet conduit through which dirt may pass into said sump.

28. In an air cleaner, a casing having an inlet, an outlet conduit extending well within said casing, said casing having a liquid sump therein, filter means disposed above the liquid in said sump, and resilient clamping means engaged around said outlet conduit below said filter means to support the same above the sump.

29. In an air cleaner, a casing having an inlet and including separable upper and lower casing sections, the lower casing section having a liquid sump therein, outlet conduit means in the upper casing section, filter means in the upper casing section disposed above said liquid sump, and a removable spring clamping element engaged around said outlet conduit to support said filter means above the sump.

30. In an air cleaner, a casing having an inlet and including a pair of separable casing sections, an outlet conduit section in each of said casing sections for telescopic association to form a complete outlet passage for the cleaner, the lower casing section having a liquid sump therein around the respective conduit section, filter means in the upper casing section around the respective conduit section, and removable spring clamping means held in place by the resiliency thereof and engaging the conduit section in the upper casing section to support said filter means in position.

THEODORE W. HALLERBERG.